Jan. 15, 1957     H. BOULESTREAU     2,777,320
GAS DENSITY METERS
Filed May 28, 1953
*Fig. 1*
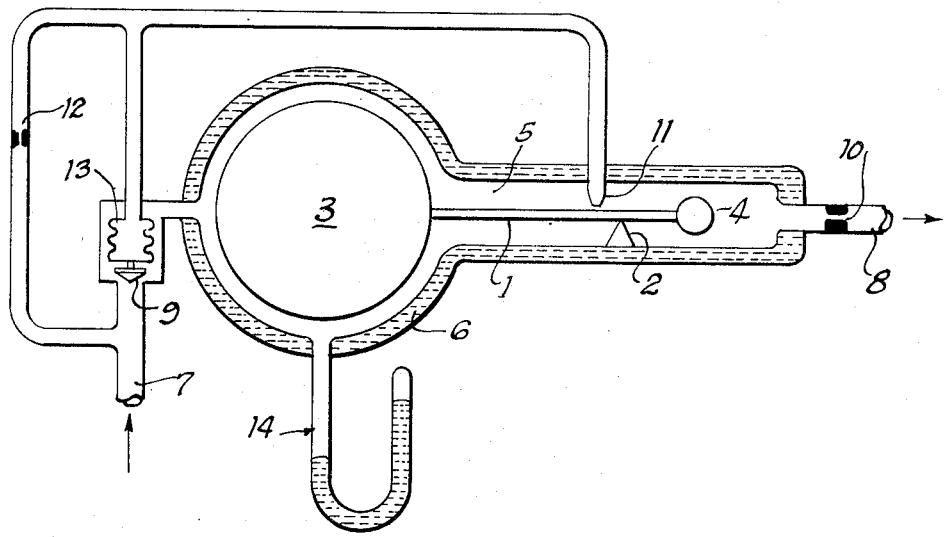
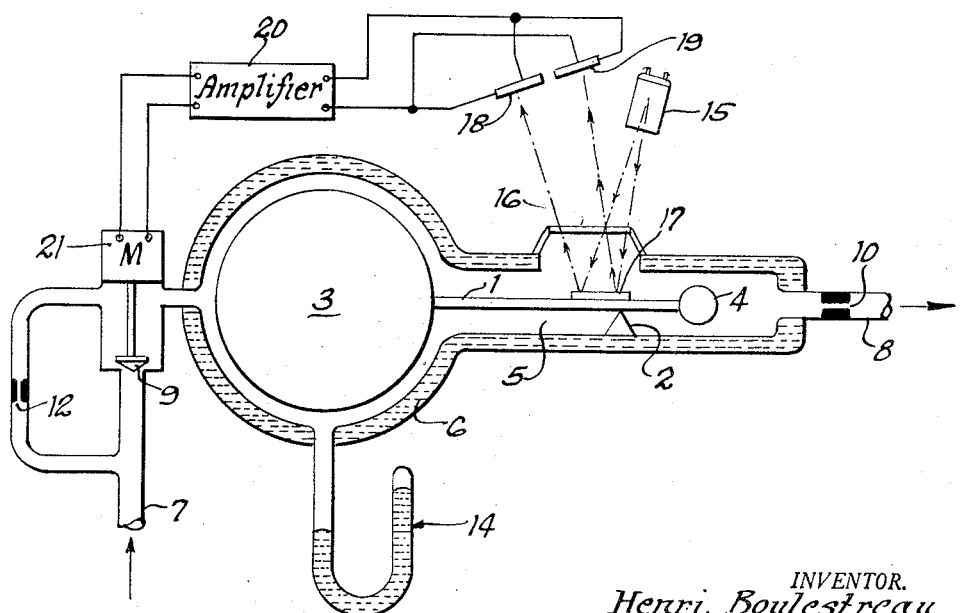
*Fig. 2*
INVENTOR.
Henri Boulestreau
BY
Att'ys.

2,777,320
GAS DENSITY METERS

Henri Boulestreau, Fontenay-aux-Roses, France, assignor to Soreg, Paris, France, a limited liability company of France Application May 28, 1953, Serial No. 357,981

4 Claims. (Cl. 73—30)

This invention relates to apparatus for measuring and indicating density of gas, more particularly, for continuously measuring and indicating density of constantly flowing gas. For example, in many industrial processes involving variable ratio mixtures of different gases, it is highly desirable to maintain continuous knowledge of the mixture densities.

The principal object of the present invention is to provide apparatus through which a small flow of gas may be maintained, and wherein the absolute pressure of a body of such gas automatically is varied in inverse relation to variation in its density. Since, under a constant temperature condition, the absolute pressure of a gas is the reciprocal of its density, at a given temperature the absolute pressure provides an accurate, measurable indication of the gas density.

The apparatus comprises a sensitive scale instrument of the kind known as "baroscope," that responds by movement to variations in the specific gravity of a gaseous medium surrounding it, and is based on movement of a system of bodies of different buoyancies, having two displacement bodies having a small difference in weight, the heavier having a volume that is very large in comparison to the volume of the other. In the instrument the baroscope is combined with means for automatically varying the pressure of gas flowing through an enclosure containing the baroscope in a manner to maintain the latter in equilibrium, which is obtained when the buoyancies of the displacement bodies compensate their difference in weight.

By way of example, and without limiting the scope of the invention, hereinafter are disclosed two embodiments of the invention differing in the means used to maintain in equilibrium the baroscope balance of the respective instruments by acting on the gas pressure.

In the accompanying drawings:

Fig. 1 is a schematic cross section disclosing an instrument embodying the invention and wherein gas pressure is controlled by pneumatic means.

Fig. 2 is a similar view disclosing an instrument provided with electrical gas pressure control means.

In Fig. 1 the sensitive balance comprises a beam 1 supported on a knife edge 2 and carrying at its extremities a weight 3 and a slightly lighter weight 4, the volume of weight 3 being very greatly larger than that of weight 4. This balance is mounted in a chamber 5 between the double walls of which circulates a fluid 6 maintained at constant temperature by means that are not shown.

The flow of gas enters chamber 5 by a channel or flow line 7 and exits through a flow line 8.

Flow of gas through chamber 5 depends on the degree of opening of a valve 9 and on the cross sectional area of a flow restrictive orifice 10 in the exit flow line 8. When valve 9 is completely open, gas pressure in chamber 5 rises to a pressure slightly below that of the supply flow line 7, when it is closed such pressure lowers to a value slightly higher than that of escape line 8. It therefore results that the ratio of absolute pressures of lines 7 and 8 should be maintained by suitable means substantially higher than the ratio of the extremities of the gas densities that are to be measured. The automatic control of pressure in chamber 5 is accomplished by a control nozzle 11 having a small diameter discharge aperture positioned close to beam 1. This nozzle is connected through a flow restrictive orifice 12 to the supply line 7. Finally, expansible bellows 13 varies, as a measure of difference in pressures upon its opposite sides, the degree of opening of valve 9. A mercury manometer 14 measures and indicates the absolute pressure in chamber 5.

The mechanism functions as follows:

It is assumed that the baroscope balance beam is in equilibrium. The substantially constant stream of gas flowing through orifice 12 and nozzle 11 creates between the interior of the nozzle and chamber 5 a pressure differential the magnitude of which depends on the spacing between beam 1 and the discharge aperture of the nozzle. This difference acts on bellows 13 to maintain valve 9 in such position that the pressure in chamber 5 is of a magnitude to maintain equilibrium of the baroscope.

If it be assumed that the specific gravity of the gas entering by flow line 7 increases, buoyancy of weight 3 increasing more than that of weight 5, beam 1 approaches nozzle 11. This results in an increase in the pressure differential across bellows 13 which results in reduction of the opening of valve 9. Pressure in chamber 5 thereupon decreases until a new equilibrium is attained, the reduction in pressure having compensated the increase in specific gravity of the gas. The embodiment described above, advantageous by reason of its simplicity and the fact that it requires no energy other than that of the gas, does not permit total utilization of the very high sensitivity of a baroscope, because of the slight reaction upon beam 1 of the gas stream delivered by nozzle 11, which reaction, however, it is within the skill of pneumatic techniques to reduce sufficiently for many applications.

The second embodiment, shown in Fig. 2, uses electrical means, and consequently permits, by reason of complete absence of reaction on the balance beam, attaining substantially higher sensitivity.

In Fig. 2, elements identical with those of Fig. 1 are indicated by the same reference numerals. On beam 1 is mounted a mirror 17, which may be plane or concave, which reflects through a transparent window 16 the light beam projected by a source 15 to a pair of photo electric cells 18, 19, which are arranged in the usual push-pull circuit. This signal output of cells 18, 19, acts through an amplifier 20 on a motor 21, which, by appropriate mechanism, operates valve 9.

Operation is as follows:

Beam 1 being in equilibrium, the light beam reflected by mirror 17 illuminates cells 18, 19 with equal intensity, which results in no signal output. Motor 21 is at rest and valve 9 in a position corresponding to the equilibrium pressure.

If it be assumed now that specific gravity of supply line 7 increases, buoyancy of weight 3 will raise it, intensity of illumination of cell 18 is diminished while that of cell 19 is increased. Thereby is produced a signal of which the phase or sense, depending on whether the system operates by alternating or direct current, operates motor 21 in a direction to reduce the opening of valve 9 until a new equilibrium is established.

I claim:

1. Apparatus for indicating density of a gas comprising structure providing an enclosed chamber having inlet and outlet connections for flow through said chamber of a gas of which the density is to be measured, a baroscope balance mounted in said chamber for moving in response to variations in density of a gas flowing therein, means for varying the rate of flow through one of said connections to vary the absolute pressure of gas in said chamber, means for detecting the position of said baroscope balance, and power operated control means cooperating with said detecting means and flow rate varying means for operating the latter in response to changes in position of said balance to decrease and increase absolute pressure of gas in said chamber respectively as said balance moves in response to increase and decrease of said gas density, and means for measuring and indicating absolute pressure of gas in said chamber.

2. Apparatus for indicating density of a gas comprising structure providing an enclosed chamber having inlet and outlet connections for flow of a gas of which the density is to be measured, valve means arranged in one of said connections for varying the relative rates of flow of gas through said connections, whereby absolute pressure of gas in said chamber may be controlled, a baroscope balance mounted in said chamber for moving in response to variations in density of a gas flowing therein, motor means operable by difference in pressures of gas in one of said connections and in said chamber, a control system including means for detecting the position of said baroscope and actuating said motor means to increase and decrease absolute pressure of gas in said chamber in response to movement of said balance responsive respectively to decrease and increase in said density, and means for measuring and indicating absolute pressure of a gas in said chamber.

3. Apparatus for indicating density of a gas comprising structure enclosing a chamber having inlet and outlet connections for flow through said chamber of a gas the density of which is to be measured, valve means arranged in one of said connections for varying rate of flow of gas therethrough, a baroscope balance mounted wholly within said chamber and with its movable arm spaced away from said structure for swinging in response to variation in density of gas in said chamber, motor means operable by difference in pressures of gas in one of said connections and in said chamber, control means actuated by movement of said baroscope balance arm and operatively connected with said valve for varying the flow through said connection to increase and decrease gas pressure in said chamber in response to movement of said balance respectively in response to decrease and increase in density of gas in said chamber, and means for measuring and indicating the absolute pressure of gas in said chamber.

4. Apparatus for indicating density of a gas comprising structure enclosing a chamber, a baroscope balance mounted in said chamber for swinging in response to variation in density of gas therein, inlet and outlet means for flow of gas through said chamber, said inlet means comprising a pair of flow lines opening into said chamber, a valve in a first one of said lines and structure providing a flow restriction in the second, said balance having a member movable by swinging of said balance and relative to the opening of said second flow line to vary rate of flow and fluid pressure therein, in inverse relation to variation of gas density in said chamber, a fluid pressure motor having an expansible chamber connected to said second line and a movable output member coupled to said valve for actuating it to increase and decrease rate of flow through said first line respectively as pressure in said second line decreases and increases, structure providing a flow restriction in said outlet means, and means for measuring and indicating absolute pressure of gas in said chamber.

References Cited in the file of this patent
UNITED STATES PATENTS

| | | |
|---|---|---|
| 803,490 | Kemp et al. | Oct. 31, 1905 |
| 1,629,526 | Pierce | May 24, 1927 |
| 2,042,374 | Wunsch | May 26, 1936 |
| 2,459,542 | Rosenberger | Jan. 18, 1949 |
| 2,662,394 | McMahon | Dec. 15, 1953 |